(12) United States Patent
Pham et al.

(10) Patent No.: US 6,664,696 B1
(45) Date of Patent: Dec. 16, 2003

(54) TOOTH SATURATION FOR REDUCED ELECTROMAGNETIC HARMONICS

(75) Inventors: Tan H. Pham, San Marcos, CA (US); Klaus D. Kloeppel, Watsonville, CA (US); Donald J. Macleod, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/795,878

(22) Filed: Feb. 28, 2001

Related U.S. Application Data
(60) Provisional application No. 60/185,953, filed on Feb. 29, 2000.

(51) Int. Cl.⁷ .................................................. H02K 1/00
(52) U.S. Cl. ..................................... 310/216; 310/254
(58) Field of Search ......................... 310/216, 42, 254, 310/67 R; 29/596–598

(56) References Cited

U.S. PATENT DOCUMENTS

| | | | | |
|---|---|---|---|---|
| 713,604 A | * | 11/1902 | Churchward ................ 310/254 |
| 737,576 A | * | 9/1903 | Burrow ....................... 310/254 |
| 919,458 A | * | 4/1909 | Poth ........................... 310/216 |
| 3,296,472 A | * | 1/1967 | Fisher ......................... 310/254 |
| 3,805,134 A | * | 4/1974 | Osamu et al. ............... 318/254 |
| 3,860,843 A | * | 1/1975 | Kawasaki et al. ........ 310/67 R |
| 4,209,720 A | * | 6/1980 | Ducrot et al. ............... 310/216 |
| 4,499,407 A | * | 2/1985 | MaCleod ..................... 310/187 |
| 4,583,015 A | * | 4/1986 | Toshimitsu ................. 310/187 |
| 4,719,378 A | * | 1/1988 | Katsuma et al. .......... 310/67 R |
| 5,030,864 A | * | 7/1991 | Hout et al. ............... 310/67 R |
| 5,248,911 A | | 9/1993 | Joseph |
| 5,250,867 A | * | 10/1993 | Gizaw ......................... 310/216 |
| 5,864,443 A | * | 1/1999 | Elsaesser et al. ........ 360/99.08 |
| 6,081,058 A | * | 6/2000 | Suzuki et al. ............... 310/261 |
| 6,181,047 B1 | * | 1/2001 | Nitta .......................... 310/254 |
| 6,218,760 B1 | * | 4/2001 | Sakuragi et al. ............ 310/254 |

* cited by examiner

*Primary Examiner*—Tran Nguyen
(74) *Attorney, Agent, or Firm*—Moser, Patterson & Sheridan, LLP

(57) ABSTRACT

The tooth saturation level is improved and electromagnetic harmonics reduced by reducing the path cross-section of area in the tooth with a geometrical means such as punched holes through the stator laminations. The punched holes alter the magnetic flux pattern by forcing the flux to go around the holes, providing a greater concentration of the flux within regions of the teeth, as well as, depending on the position of the hole along the long axis of the tooth, redistributing the flux density in the air gap. This redistributed flux density will also reduce the harmonics to improve the electromechanical device electromagnetic performance.

16 Claims, 7 Drawing Sheets

Bottom Hole-OD=0.8 mm

TOOTH SATURATION FOR REDUCED ELECTROMAGNETIC HARMONICS

CROSS-REFERENCE TO RELATED APPLICATIONS

This application claims benefit of U.S. provisional patent application Ser. No. 60/185,953, filed Feb. 29, 2000 and entitled "Tooth Saturation for Reduced Electromagnetic Harmonics", which is herein incorporated by reference.

FIELD OF THE INVENTION

The present invention generally relates to a brushless DC motor, and more particularly, one especially designed for use in driving a rotating hard disc in a hard disc drive, the motor having improved tooth saturation characteristics.

BACKGROUND OF THE INVENTION

In a disc drive, data is stored on a disc supported for constant rotation by a spindle motor which typically comprises a brushless DC motor. The data accessed using an actuator which supports the transducer which was designed to fly over the surface of the disc as the disc rotates. In such permanent magnet motors, the small size of the motor, which is required for its use in a disc drive, makes optimization of all the motor parameters difficult. The motor typically comprises a stator having a plurality of teeth about which windings are placed to be energized to create the necessary rotation of the rotor. The rotor includes a thin rotor magnet which interacts with the flux generated at the stator to cause the necessary constant speed motor rotation. In such a small, high-powered motor, the air gap between the facing surfaces of the stator and the rotor must also be minimized. The combination of the minimal air gap, the thinness of all components, the slotted stator and the need for high performance, leads to a difficult design equation.

In such small, high performance motors, it is especially important to have a desired variation in the inductance of the motor, preferably by controlling the saturation as it changes with position of the teeth on the magnet. This produces several operational advantages. A problem in a motor of such small size is optimizing the saturation characteristics of the motor. Such optimized saturation can be difficult to achieve, because the saturation level changes as the stator teeth change position relative to the rotor magnets, and the ability to redistribute the flux path and density in the airgap between the stator teeth and the rotating magnet.

The magnetic saturation as a function of the position conditions the electromechanical devices' electromagnetic performance in terms of back electromagnetic force (EMF) waveform and harmonics generated in the system. It is desirable to both optimize the saturation, and distribute or redistribute the flux density in the air gap to minimize torque ripple. The optimum redistribution of the flux density in the air gap will reduce the torque ripple and reduce acoustic noise. Thus an improved approach for optimizing tooth saturation and flux distribution patterns in the air gap is highly desired.

SUMMARY OF THE INVENTION

Therefore, it is an objective of the present invention to provide a permanent magnet excited motor having improved electromagnetic performance by improving the magnetic saturation level in the teeth of the stator.

It is a further objective of the invention to provide an improved motor with better distribution of the flux density in the air gap between the teeth of the stator and the rotor magnet.

A further objective of the invention is to provide a motor with an improved magnetic saturation level resulting in reduced electromagnetic harmonics to improve the motor performance.

Another objective of the invention is to provide an electromagnetic motor design with an improved distribution of flux density in the air gap to reduce the harmonics in the motor and thereby the acoustic noise.

Yet a further objective of the invention is to provide a motor especially for use as a spindle motor in a disc drive which has a design for the stator teeth which improves the magnetic saturation level of the teeth to allow for accurate switching of the motor windings.

A further objective of the invention is to provide a motor for use as a spindle motor in a disc drive in which the teeth are designed to redistribute the flux density in the air gap and reduce the harmonics and torque ripple and thereby acoustic noise performance of the motor.

In summary, the tooth saturation level is improved and electromagnetic harmonics reduced by reducing the path cross-section of area in the tooth with a geometrical means such as punched holes through the stator laminations. The punched holes alter the magnetic flux pattern by forcing the flux to go around the holes, providing a greater concentration of the flux within regions of the teeth, as well as, depending on the position of the hole along the long axis of the tooth, redistributing the flux density in the air gap. This redistributed flux density will give a specific desired form to the back EMF waveform. This controlled shaping of back EMF by controlling saturation will reduce the harmonics to improve the electromechanical device electromagnetic performance.

Other details and advantages of the present invention will become apparent to a person of skill in this field who studies the following figures in conjunction with the description of a preferred embodiment or embodiments to follow.

DETAILED DESCRIPTION OF THE PREFERRED EMBODIMENT

Figure 1:
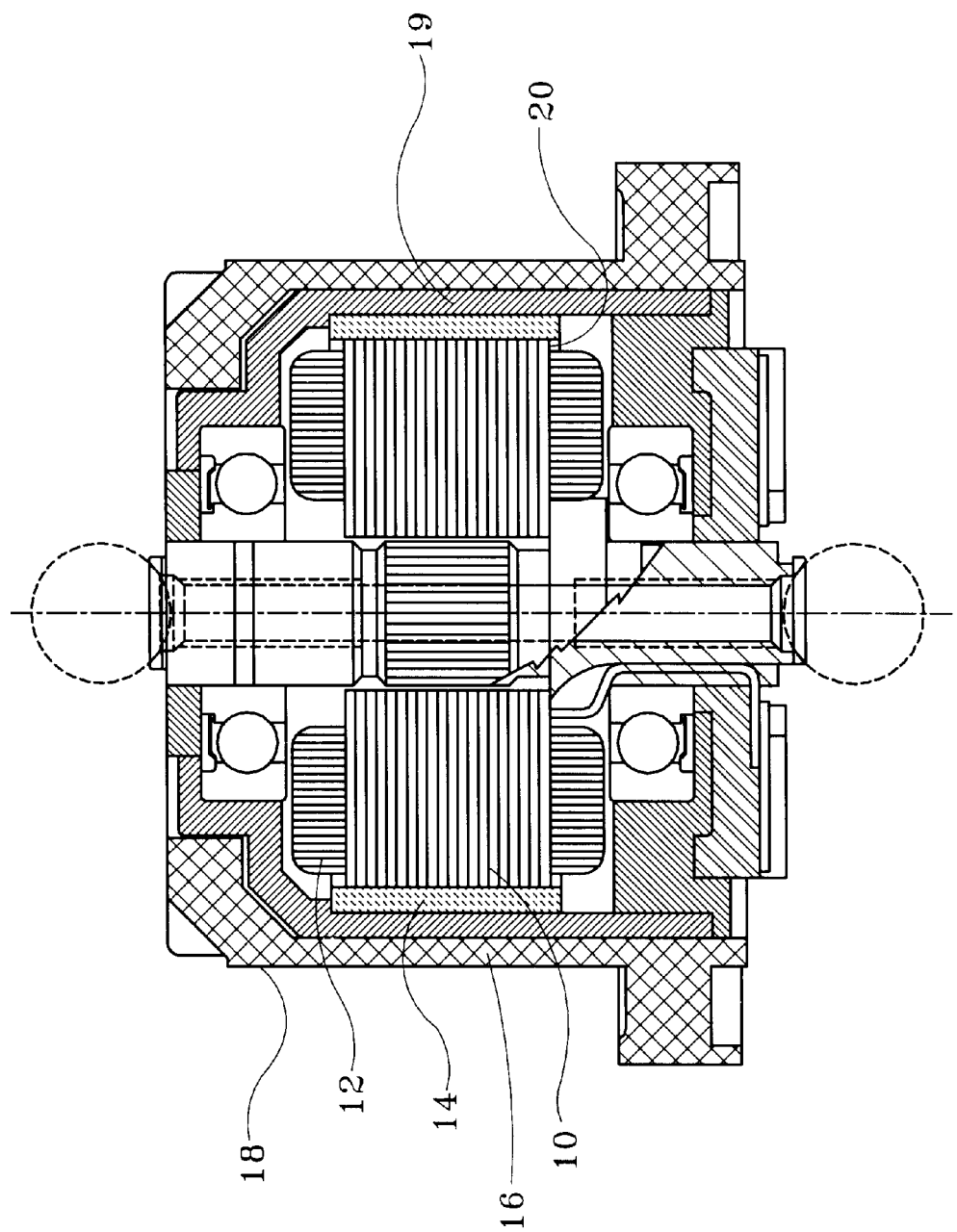
FIG. 1 is a vertical sectional view of a motor in which the present invention may be useful.

FIG. 1 is a vertical sectional view of a typical motor with which any of the embodiments of the present invention could be used with many of the improvements including increased saturation, optimized time constant, and/or redistribution of the flux in the air gap could be achieved. The many details of the motor, of course, are not significant to the present invention, but all presented herein simply to more fully describe the environment in which the present invention is useful.

The motor 2 is a typical three phase motor of a type well known in the disc drive field, having a stator 10 supporting coils 12, interacting with a magnet 14 which is supported on the interior surface of an external hub 16. A disc or discs (not shown) are supported on the exterior surface 18 of the motor for rotation at constant speed. A finite gap 20 is defined between the stator and the motor i.e., bordered by the stator 10 on one side and the permanent magnets 14 on the opposite side.

The magnets 14 in such a motor are cylindrical in shape and comprise alternating north/south poles, with a transition region between each pole. For reasons explained above and already well known in this field, such a design is a well known source of running torque ripple because of the effects of the interaction between the magnetic poles and the stator as the transition edges of the magnetic poles pass the gaps in the stator having relative rotation.

Figure 2:
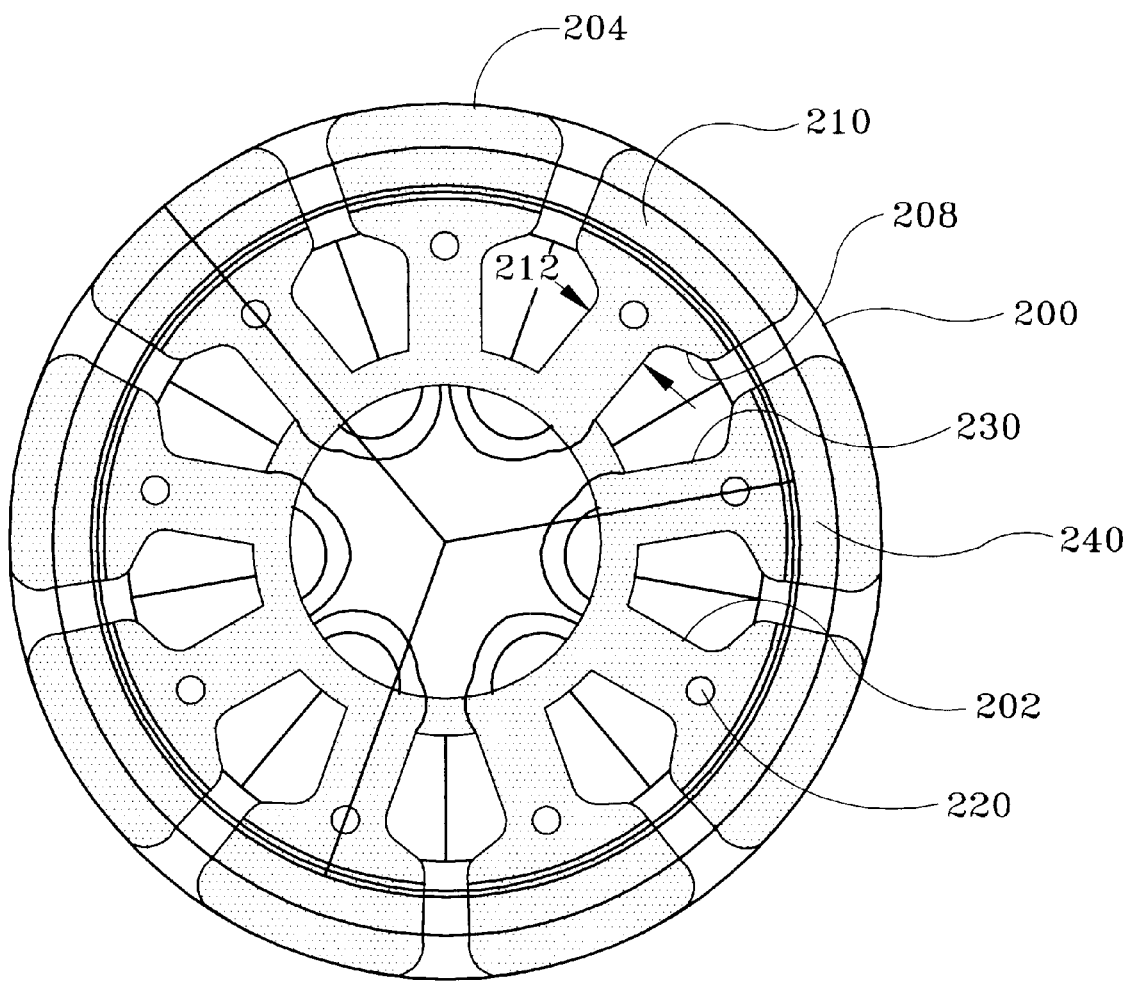
FIG. 2 is a plan view of the stator teeth and rotor magnet of an exemplary design in which this invention is useful.

The components of the stator motor, which are to be considered in the implementation and analysis of this invention, are shown in the plan view of FIG. 2 which is a sectional view through a motor showing the magnet 200 and the stator teeth 202. This motor as can be seen is a 9-slot, 6-pole motor, which means that there are nine slots defined between the teeth, and six poles defined by the three magnet segments. The teeth 202 each carry windings which are not shown; energization of the windings creates the flux which is shown by the flux lines 204 which are shown passing linearly through the long access of the teeth, out through the shoe 208 of each tooth across the air gap 210 and into the magnet 200. As is known in this technology, for a given tooth width 212, the stator steel lamination of which is used to form the teeth 202 has a magnetic saturation level that varies with the position of the tooth relative to the rotor magnet pole. The tooth magnetic saturation versus position conditions the electromagnetic device electromagnetic performance, such as back EMF, harmonics, acoustic noise, detent, and other characteristics as described fully above.

According to the present invention, the tooth saturation level can be improved, the back EMF waveform reshaped, electromagnetic harmonics reduced, and tongue ripple improved by reducing the flux path cross-section in one or more of the teeth with geometrical altering means such as the holes 220 in the stator laminations. The punched holes alter the magnetic flux pattern 210 by forcing the flux to go around the holes. Thus the flux deflector poles 220 redistribute the flux density in the air gap, smoothing the back EMF waveform and reduce the harmonics to improve the electromechanical device electromagnetic performance. The holes can be of any geometry, that is circular, square, or the like, as long as the desired, improved tooth saturation and distribution of flux in the air gap is achieved. In tests of exemplary embodiments where the width 212 of the tooth was between 2 mm and 2.4 mm, it was found that the optimum performance was obtained with a whole hole outer diameter (O.D.) of 0.6 to 1.0 mm for tooth width of 2.0 mm or about 30% of total tooth width; for a tooth width of 2.4 mm, the optimum performance was obtained with a hole OD of 0.8 to 1.0 mm, or about 33% of the tooth width. It was therefore concluded that an optimum combination of whole OD and tooth width is required to yield the proper of tooth saturation and optimum back EMF waveform shaping for a spindle motor.

It was further found that the holes are easy to insert simply by punching or the like into an established stator tooth design. This increases local saturation in the stator lamination teeth with a minimal increase of core loss due to the saturation increase. It was further found that an appropriate choice of hole size, for example, about 30 to 45% of tooth width and hole location reduce the harmonic contents when compared to the original motor, with no level of induced voltage back EMF, and can reduce also the overall peak-to-peak detent. Thus, the hole can be used as a means to improve the motor EM performance in terms of inductance, delta inductance, the EMF and intense and detent. It was further found that an oversized hole can have adverse effects on motor EM performance, while an undersized hole has insufficient effects.

In the preferred embodiment, the hole is located on the center access 230 of each tooth, and near or at the point where the tooth widens into the shoe region 240.

Figure 3A:
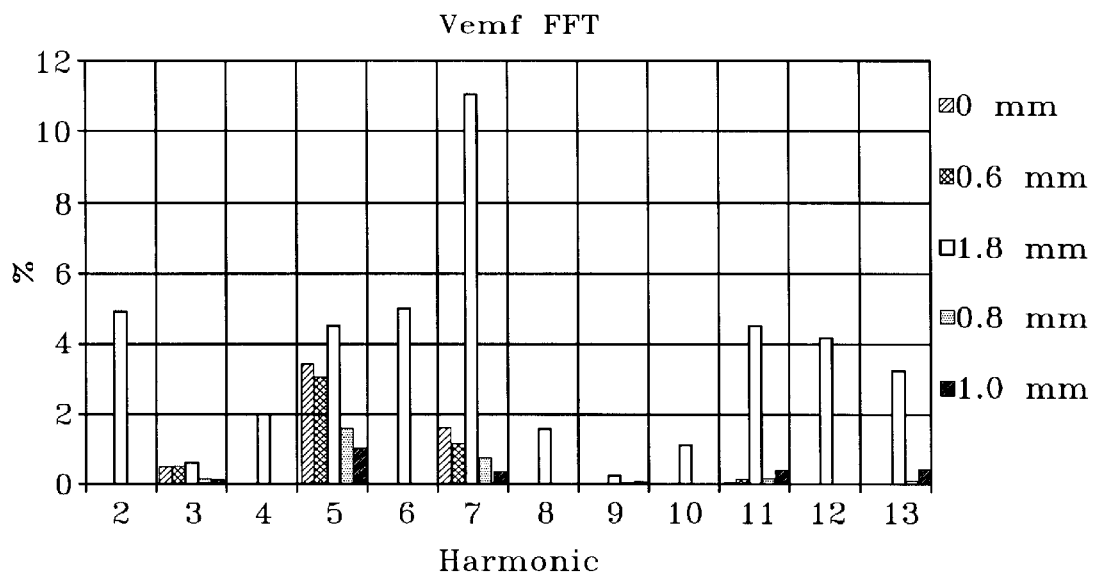
FIGS. 3A and 3B and 4A and 4B illustrate the beneficial effects of the present invention.
Figure 3B:
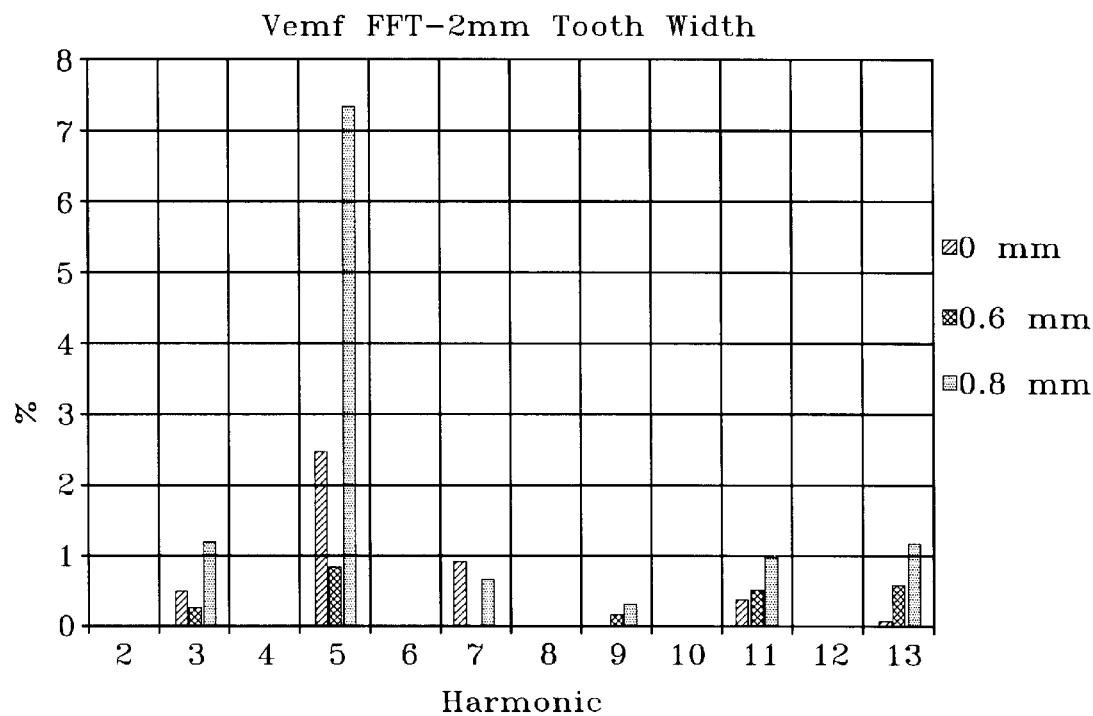
Figure 4A:
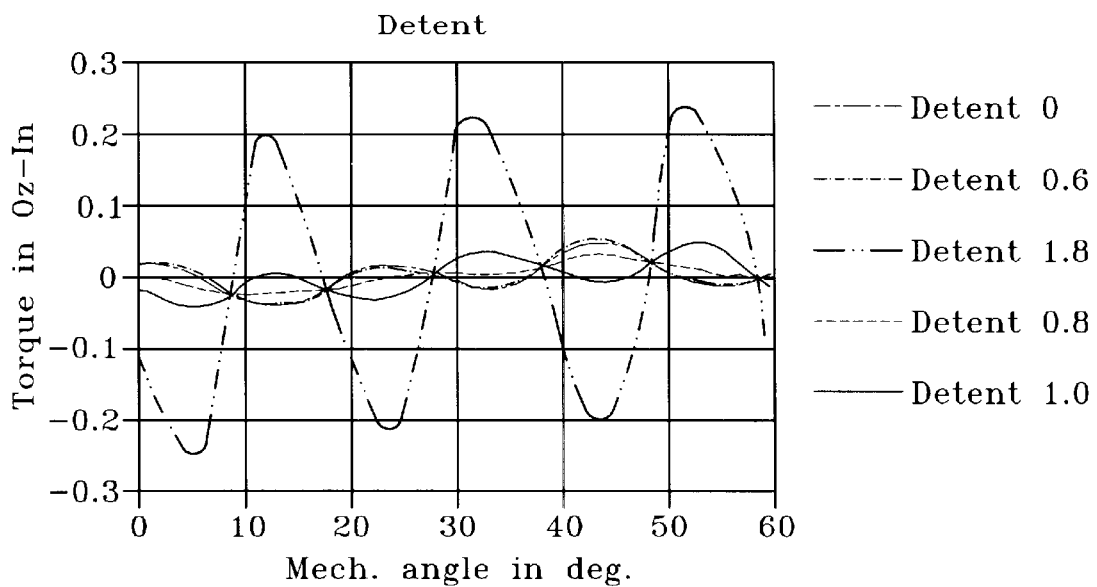
Figure 4B:
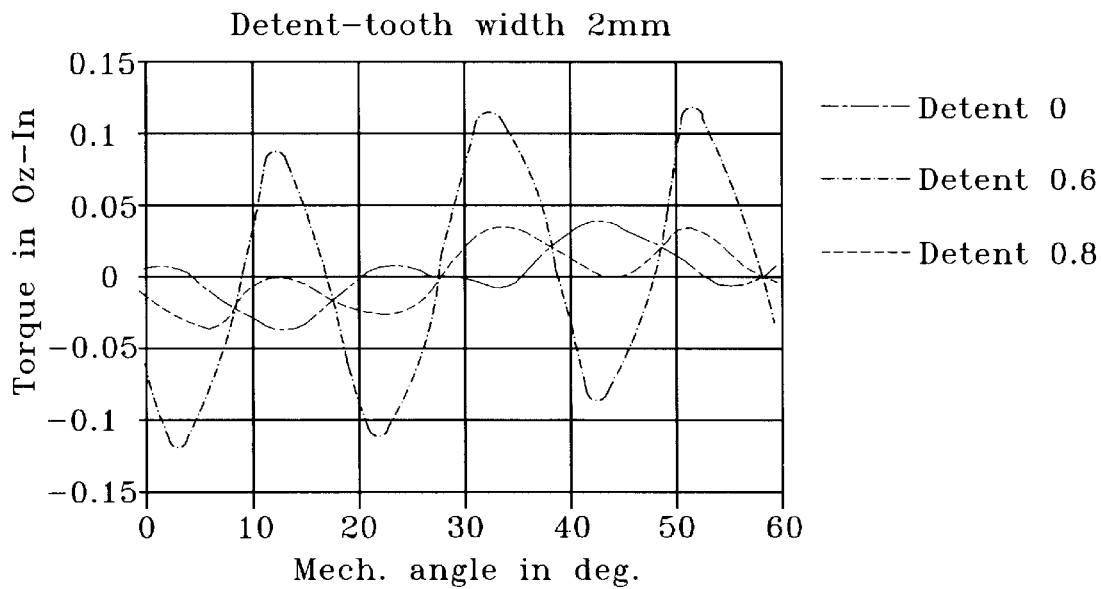

The following figures illustrate a few of the benefits of the present invention. For example, referring to FIG. 3A and 3B can be seen that in a hole size of 0.8 mm or 1.0 mm can reduce the harmonic content of VEMF compared to the initial design with no holes. This is especially true, for example, at the fifth and seventh harmonics. Referring next to FIG. 4A and 4B, it can be seen that a hole size of 0.8 mm will reduce the peak-to-peak detent as compared with the no hole design by about 40%. Thus, it is apparent from these figures that the saturation is improved and flux distribution (as shown in FIG. 2) altered; thus, harmonic content is reduced when compared to the original motor design as well as reducing the overall peak-to-peak detent.

Further, it has been found that although there is an increase in local saturation in the stator, there is a minimal increase in core losses due to the saturation increase as it is very localized. There is also the desirable increase in inductance and delta inductance due to the increase in saturation in the stator teeth.

Figure 5:
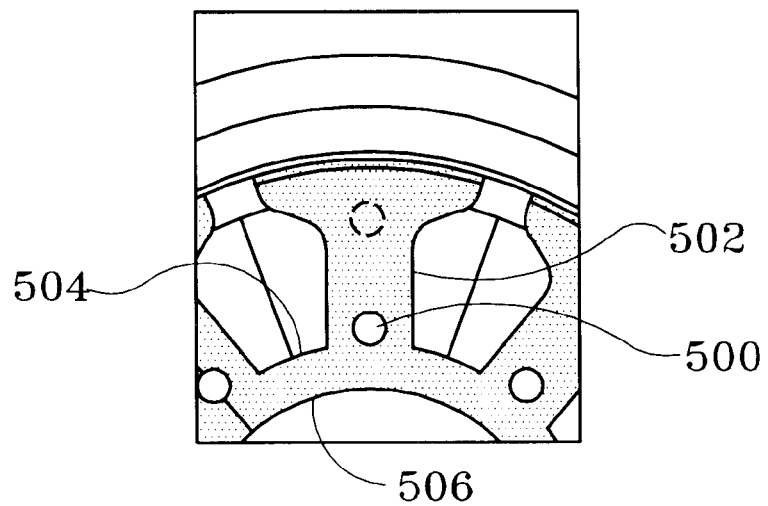
FIG. 5 illustrates an alternative location of the hole which embodies the present invention.
Figure 6:
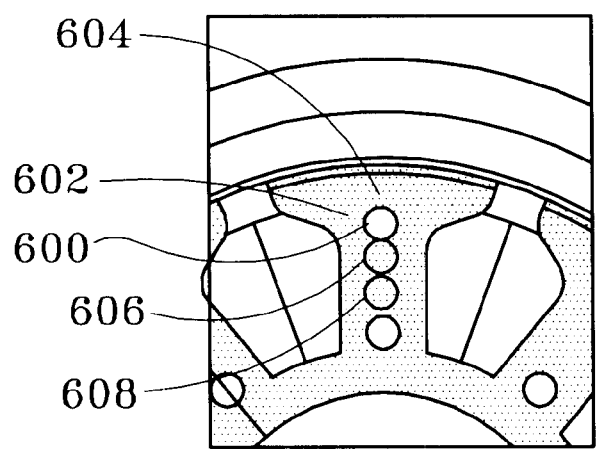
FIG. 6 illustrates alternative locations of the hole in the stator tooth relative to the shoe.

FIGS. 5 and 6 show alternative locations for the hole and the following figures show the effect of those hole locations. The location discussed up to this point is on or near the tooth access and at the top of the tooth with the top of the hole aligned with the bottom of the stator shoe. In FIG. 5, an alternative location for the hole 500 is shown. This new location is at the bottom of the tooth 502 with the bottom of the hole aligned with the outer diameter 504 of the stator yoke 506. It was found by testing that this hole location, subject to the same size restraints as discussed above, was almost equally effective. In further alterations to the design, a number of different hole locations were explored as shown in FIG. 6. The basic or reference hole location with the top of the hole aligned with the bottom of the stator show is identified as location 600.

Figure 7A:
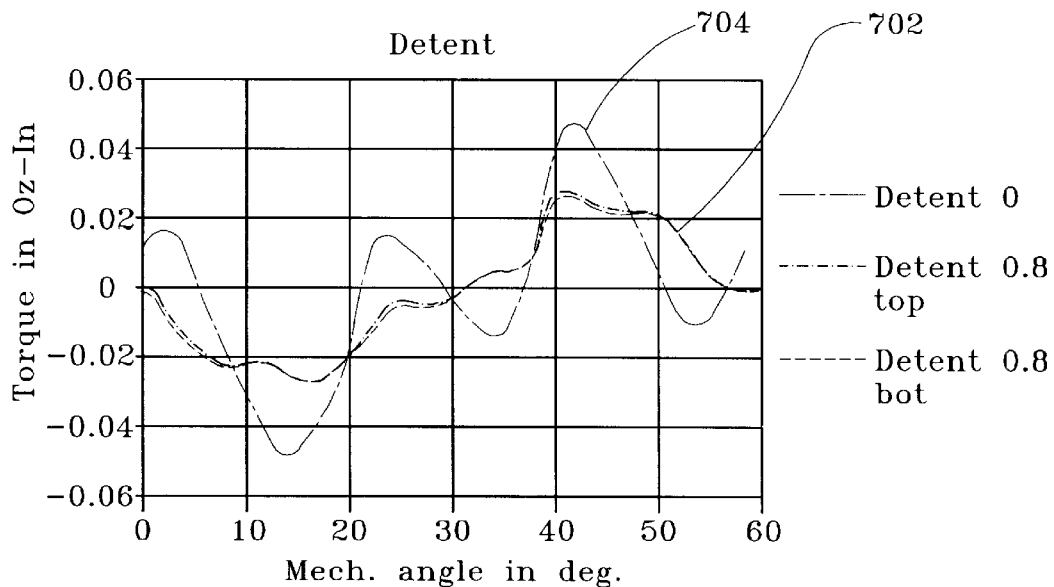
FIG. 7A and 7B illustrate the beneficial effects of the invention as illustrated in FIG. 5.
Figure 7B:
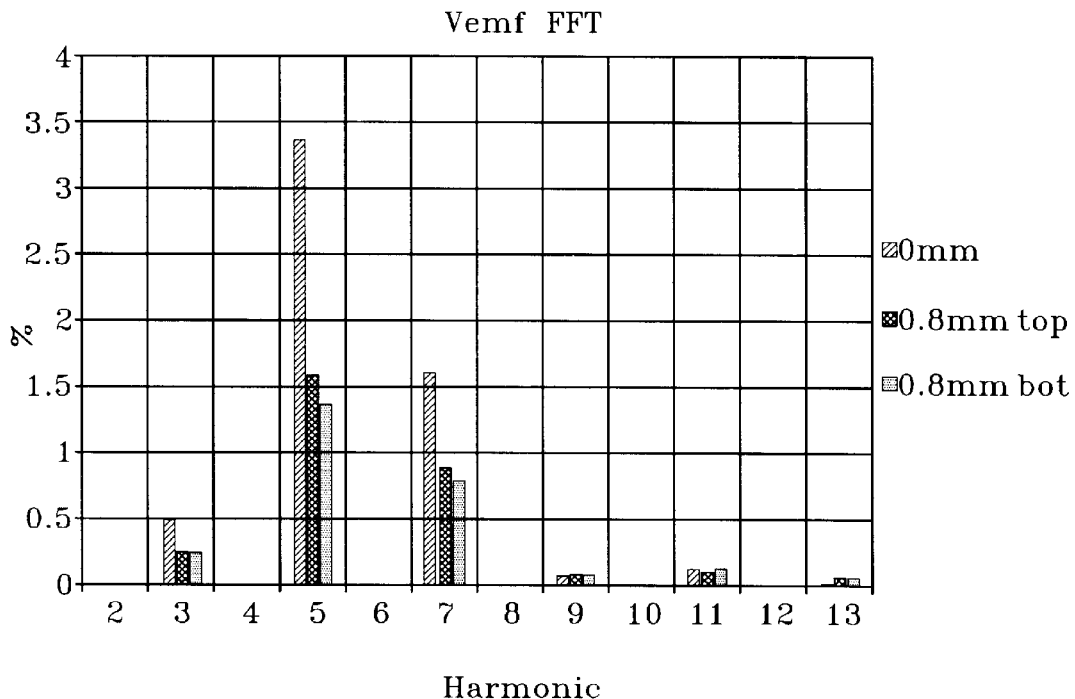

Further locations explored include location 602 which is located one radius up the access toward the shoe and a location 604 identified as location two up which is twice the radius of the access; further locations explored include location 606 which is one down or one radius down the access and location 608 which is two down or twice the radius down the access of the shoe. A general summary of the effects is that as long as the hole is below the bottom of the stator shoe, the local saturation increase due to the hole improves the motor electromagnetic performance. When the hole is located in the shoe, the local saturation increase modifies the flux density distribution in the gap, leading to additional harmonics and worsens the motor EM performance. Thus referring to FIG. 7A, it can be seen that almost the same beneficial effects in terms of motor detent are achieved as indicated by reference line 702 whether the hole is located near the bottom of the pole shoe or near the top or outer diameter of the yoke as compared to the use of no hole at all as represented by line 704. Further, as shown in FIG.

Figure 8A:
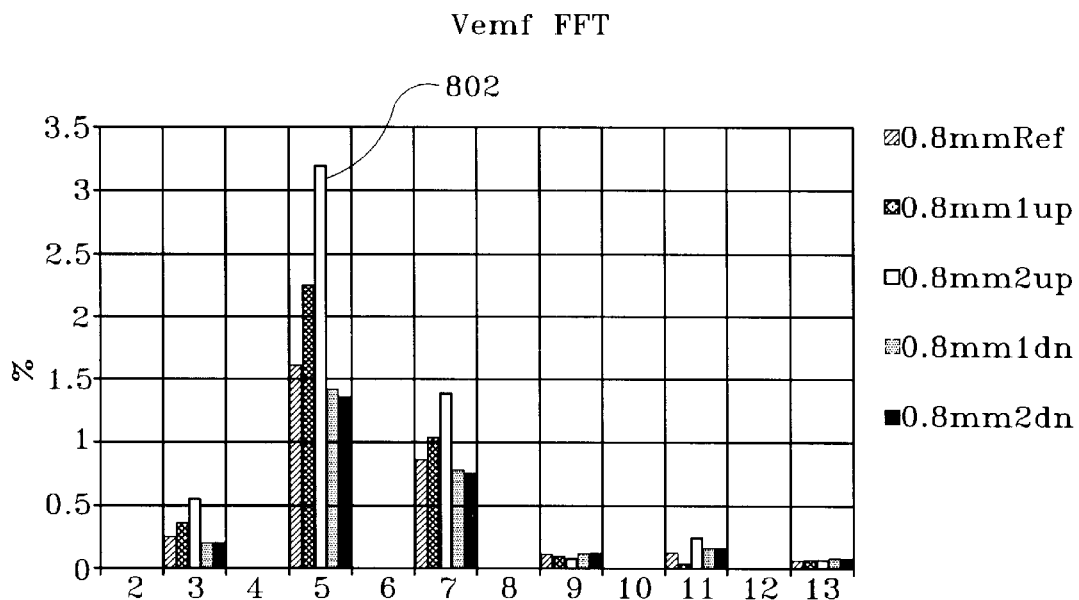
FIGS. 8A and 8B illustrate the beneficial effects of the invention as illustrated in FIG. 6.
Figure 8B:
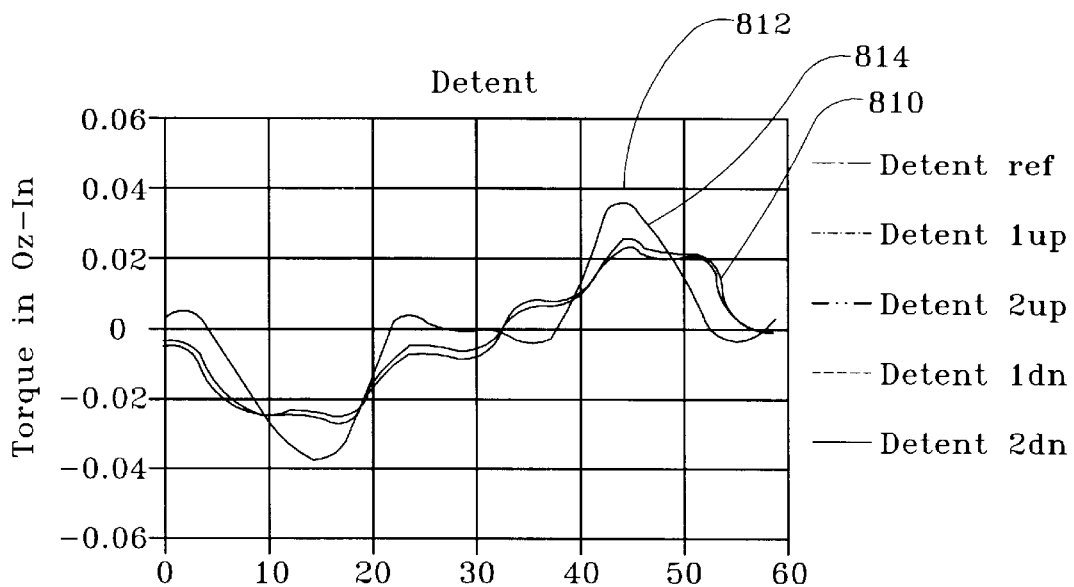

7B, a substantial improvement in harmonic content is achieved as compared to the use of no hole at all whether the hole is located near the bottom of the pole shoe or the top of the stator yoke. Further, referring to FIG. 8A, it can be seen that there are clear improvements in harmonic content so long as the hole is located near or below the pole shoe; but if the hole is located up in the pole shoe, as shown for example at 802 or 804, then the benefits are not achieved. Similarly, in FIG. 8B, it appears that improvement is achieved in the detent as shown at line 810 so long as the hole is below the pole shoe. Once the hole intrudes up into the pole shoe as shown by lines 812 and 814, then there is a deterioration in the detent.

Other features and advantages of this invention will be apparent to a person of skill in the art who studies this invention disclosure. Therefore, the scope of the invention is to be limited only by the following claims.

What is claimed is:

1. A motor having improved tooth saturation comprising a stator comprising a plurality of teeth extending radially toward a surrounding rotor, and a rotor supporting a magnet which electromagnetically interacts with the stator, the stator comprising an inner yoke and a plurality of teeth extending radially toward the magnet and having a shoe portion at a distal end thereof from the stator yoke, each of the stator teeth having a hole punched there through at or near a central radially extending axis of the tooth, the hole being disposed between the inner yoke and shoe portion, the hole being a predetermined size selected to effect the saturation of the tooth when windings on the tooth are energized.

2. A motor as claimed in claim 1 wherein the diameter of the hole is about 30 to 45% of the tooth width.

3. A motor as claimed in claim 2 wherein the hole is located with its edge at the inner diameter of the pole shoe.

4. A motor as claimed in claim 1 wherein the hole is located with an edge aligned with the outer diameter of the stator inner yoke.

5. A motor as claimed in claim 4 wherein the hole is located with its edge at the inner diameter of the pole shoe.

6. A motor as claimed in claim 1 wherein the tooth width is about 2 mm, and the hole O.D. outer diameter is about 0.6 to 0.8 mm.

7. A motor as claimed in claim 6 wherein the hole is located with its edge at the inner diameter of the pole shoe.

8. A motor as claimed in claim 6 wherein the hole is located with an edge aligned with the outer diameter of the stator inner yoke.

9. A motor as claimed in claim 1 wherein the tooth width is about 2.4 mm, and the hole O.D. outer diameter is about 0.6 through 0.8 mm.

10. A motor as claimed in claim 9 wherein the hole is located with its edge at the inner diameter of the pole shoe.

11. A motor as claimed in claim 9 wherein the hole is located with an edge aligned with the outer diameter of the stator inner yoke.

12. A motor having improved tooth saturation comprising a stator comprising a plurality of teeth extending radially toward a surrounding rotor, and a rotor supporting a magnet which electromagnetically interacts with the stator, the stator comprising an inner yoke and a plurality of teeth extending radially toward the magnet and having a shoe portion at a distal end thereof from the stator yoke and means disposed between the inner yoke and shoe portion for altering the saturation of the teeth with rotation of the magnet to smooth a back EMF electromagnetic force waveform.

13. The motor of claim 12, wherein the means for altering the saturation of the teeth is located to minimize a harmonic content waveform.

14. The motor of claim 12, wherein the means for altering the saturation of the teeth comprises at least one hole having an outer diameter selected to redistribute the flux density in an air gap between the shoe portion and the rotor.

15. The motor of claim 14, wherein the outer diameter is between about 0.8 mm and 1.0 mm.

16. The motor of claim 14, wherein the percentage ratio of an outer diameter of the one or more holes to a teeth width is less than about 33 percent.

* * * * *